(12) United States Patent
McCreary et al.

(10) Patent No.: US 11,513,413 B2
(45) Date of Patent: Nov. 29, 2022

(54) ELECTRO-OPTIC MEDIA AND WRITABLE DISPLAY INCORPORATING THE SAME

(71) Applicant: E Ink Corporation, Billerica, MA (US)

(72) Inventors: Michael D. McCreary, Acton, MA (US); Richard J. Paolini, Jr., Framingham, MA (US); Stephen J. Telfer, Arlington, MA (US); Samantha Morrill, Nashua, NH (US)

(73) Assignee: E Ink Corporation, Billerica, MA (US)

( * ) Notice: Subject to any disclaimer, the term of this patent is extended or adjusted under 35 U.S.C. 154(b) by 484 days.

(21) Appl. No.: 16/665,151

(22) Filed: Oct. 28, 2019

(65) Prior Publication Data
US 2020/0133089 A1     Apr. 30, 2020

Related U.S. Application Data

(60) Provisional application No. 62/752,614, filed on Oct. 30, 2018.

(51) Int. Cl.
*G02F 1/167* (2019.01)
*G06F 3/0354* (2013.01)
*B32B 17/10* (2006.01)
*G02F 1/00* (2006.01)

(52) U.S. Cl.
CPC ........ *G02F 1/167* (2013.01); *B32B 17/10522* (2013.01); *G02F 1/0027* (2013.01); *G06F 3/03545* (2013.01)

(58) Field of Classification Search
CPC . G02F 1/167; G02F 1/0027; B32B 17/10522; G06F 3/03545; G09G 3/344
See application file for complete search history.

(56) References Cited

U.S. PATENT DOCUMENTS

| | | |
|---|---|---|
| 6,241,921 B1 | 6/2001 | Jacobson |
| 6,525,866 B1 | 2/2003 | Lin et al. |
| 6,738,050 B2 | 5/2004 | Comiskey et al. |
| 6,831,771 B2 | 12/2004 | Ho et al. |
| 6,866,760 B2 | 3/2005 | Paolini, Jr. et al. |

(Continued)

FOREIGN PATENT DOCUMENTS

JP     2004287068 A     10/2004

OTHER PUBLICATIONS

Kitamura, T. et al., "Electrical toner movement for electronic paper-like display", Asia Display/IDW '01, pp. 1517-1520, Paper HCS1-1 (2001). Jan. 1, 2001.

(Continued)

*Primary Examiner* — Roy P Rabindranath
(74) *Attorney, Agent, or Firm* — Ioannis Constantinides

(57) ABSTRACT

An electro-optic device comprising electrophoretic medium including a dispersion of a plurality of particles in a fluid configured to migrate within the fluid in a direction responsive to an applied electric field. The plurality of particles include a first type of particles having a first charge of a first charge polarity, a second type of particles having a second charge of a second charge polarity, and a third type of particles having a third charge of the second charge polarity. The first charge polarity is opposite to the second charge polarity, and the third type of particles are configured to migrate within the fluid in a direction responsive to an applied magnetic field gradient.

1 Claim, 9 Drawing Sheets

(56) References Cited

U.S. PATENT DOCUMENTS

| | | |
|---|---|---|
| 6,870,661 B2 | 3/2005 | Pullen et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,130,106 B2 | 10/2006 | Cannas et al. |
| 7,144,942 B2 | 12/2006 | Zang et al. |
| 7,170,670 B2 | 1/2007 | Webber et al. |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,339,715 B2 | 3/2008 | Webber et al. |
| 7,345,810 B2 | 3/2008 | Chopra et al. |
| 7,411,719 B2 | 8/2008 | Paolini, Jr. et al. |
| 7,453,445 B2 | 11/2008 | Amundson |
| 7,529,019 B2 | 5/2009 | Baesjou et al. |
| 7,535,624 B2 | 5/2009 | Amundson et al. |
| 7,561,324 B2 | 7/2009 | Duthaler et al. |
| 7,580,180 B2 | 8/2009 | Ho et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 3,009,348 A1 | 8/2011 | Zehner et al. |
| 8,115,729 B2 | 2/2012 | Danner et al. |
| 8,537,453 B2 | 9/2013 | Joo et al. |
| 8,773,398 B2 | 7/2014 | Funo et al. |
| 8,928,634 B2 | 1/2015 | Hsu |
| 9,114,663 B2 | 8/2015 | Ho et al. |
| 9,152,005 B2 | 10/2015 | Morikawa et al. |
| 9,279,906 B2 | 3/2016 | Kang |
| 9,459,510 B2 | 10/2016 | Lin |
| 9,697,759 B2 | 7/2017 | Yamashita et al. |
| 9,697,778 B2 | 7/2017 | Telfer et al. |
| 9,759,980 B2 | 9/2017 | Du et al. |
| 9,880,646 B2 | 1/2018 | Sainis et al. |
| 9,953,588 B1 | 4/2018 | Telfer et al. |
| 10,032,419 B2 | 7/2018 | Lin et al. |
| 10,067,731 B2 | 9/2018 | Mabey et al. |
| 10,088,714 B2 | 10/2018 | Shibazaki |
| 10,162,242 B2 | 12/2018 | Wang et al. |
| 10,175,550 B2 | 1/2019 | Paolini, Jr. et al. |
| 10,282,033 B2 | 5/2019 | Crounse et al. |
| 2004/0041799 A1 | 3/2004 | Vincent et al. |
| 2006/0077171 A1* | 4/2006 | May ................ G09G 3/344 345/107 |
| 2008/0285113 A1 | 11/2008 | Gillies et al. |
| 2009/0174651 A1 | 7/2009 | Jacobson et al. |
| 2013/0141780 A1* | 6/2013 | Jeon ................ G09G 3/3453 359/296 |
| 2015/0005720 A1 | 1/2015 | Zang |
| 2015/0103394 A1* | 4/2015 | Wang ................ G02F 1/1685 252/500 |
| 2015/0277160 A1 | 10/2015 | Laxton |
| 2016/0012710 A1 | 1/2016 | Lu et al. |
| 2017/0061895 A1 | 3/2017 | Paolini, Jr. et al. |
| 2017/0336896 A1 | 11/2017 | Paolini, Jr. et al. |
| 2017/0365223 A1* | 12/2017 | VanBlon ............ G09G 3/342 |
| 2018/0246598 A1* | 8/2018 | Sainis ............... G02F 1/1685 |

OTHER PUBLICATIONS

Yamaguchi, Y. et al., "Toner display using insulative particles charged triboelectrically", Asia Display/IDW '01, pp. 1729-1730, Paper AMD4-4 (2001). Jan. 1, 2001.

Korean Intellectual Property Office, PCT/US2019/058258, International Search Report and Written Opinion, dated Feb. 21, 2020.

European Patent Office, "Extended European Search Report", EP Appl. No. 19878180.9, dated Jun. 10, 2022.

* cited by examiner

ELECTRO-OPTIC MEDIA AND WRITABLE DISPLAY INCORPORATING THE SAME

RELATED APPLICATIONS

This application claims priority to U.S. Provisional Application No. 62/752,614, filed Oct. 30, 2018, which is incorporated herein by reference in its entirety.

BACKGROUND

The technology described herein relates to an electro-optic device comprising electrophoretic medium containing charged particles and magnetically responsive particles that can be addressed with a specialized instrument (stylus or print head) and related methods.

The entire contents of all U.S. patents and published Applications mentioned below are herein incorporated by reference.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme, which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained with in a plurality of cavities formed within a carrier medium, typically a polymeric film. The technologies described in these patents and applications include:

(a) Electrophoretic particles, fluids and fluid additives; see for example U.S. Pat. Nos. 7,002,728, 7,679,814, 9,759,980, and 6,870,661;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348 and U.S. Patent Application Publication No. US2017/0336896; and (j) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A variety of systems is available for addressing an electro-optic display with a stylus. For example, a stylus can be used to take notes on certain tablets. As a user passes the stylus over a surface of the electro-optic display, the electro-optic display activates pixels corresponding to those over which the stylus passed, based on the position of the stylus detected by the electro-optic display. Some magnetically responsive displays may be addressed with a stylus that contains a magnet and/or produces a magnetic field.

Current writable electro-optic display systems are limited in the number of colors that may be provided using an electrophoretic medium. Accordingly, there is a need for improved electrophoretic-based writable devices that enable a user to produce images having multiple colors.

SUMMARY

In a first aspect of the present invention, an electro-optic device comprises a first surface on a viewing side, a second surface on the opposite side of the first surface, an electrophoretic medium disposed between a light-transmissive electrically conductive layer and an array of pixel electrodes and comprising a plurality of particles in a fluid, the plurality of particles comprising (1) a first type of particles having a first color, a first charge of a first charge polarity, (2) a second type of particles having a second color, a second charge of a second charge polarity, and (3) a third type of particles having a third color, a third charge of the second charge polarity, wherein the first, second and third colors are different from one another, the first charge polarity is opposite to the second charge polarity, the plurality of particles are configured to migrate within the fluid in a direction responsive to an applied electric field, the third type of particles are configured to migrate within the fluid in a direction responsive to an applied magnetic field gradient, the second type of particles have an electric field threshold, such that (a) application of a voltage potential difference between the light-transmissive electrically conductive layer and a pixel electrode to generate an electric field stronger than the electric field threshold and having a polarity driving the second type of particles adjacent to the light-transmissive electrically conductive layer, will cause a pixel corresponding to the pixel electrode to display the second color at the first surface, (b) application of a voltage potential difference between the light-transmissive electrically conductive layer and a pixel electrode to generate an electric field stronger than the electric field threshold and having a polarity driving the first type of particles adjacent to the light-transmissive electrically conductive layer, will cause a pixel corresponding to the pixel electrode to display the first color at the first surface, (c) once the first color is displayed at the first surface, application of a voltage potential difference between the light-transmissive electrically conductive layer and a pixel electrode to generate an electric field weaker than the electric field threshold having a polarity driving the third type of particles adjacent to the light-transmissive electrically conductive layer, will cause a pixel corresponding to the pixel electrode to display the third color, In another aspect of the present invention, a method of operating an electro-optic device, wherein the electro-optic device comprises (a) a first surface on a viewing side, (b) a second surface on the opposite side of the first surface, (c) an electrophoretic medium disposed between a light-transmissive electrically conductive layer and an array of pixel electrodes and comprising a plurality of particles in a fluid, the plurality of particles comprising (1) a first type of particles having a first color, a first charge of a first charge polarity, (2) a second type of particles having a second color, a second charge of a second charge polarity, and (3) a third type of particles having a third color, a third charge of the second charge polarity, wherein the first, second and third colors are different from one another, wherein the first charge polarity is opposite to the second charge polarity, wherein the plurality of particles are configured to migrate within the fluid in a direction responsive to an applied electric field, and wherein the third type of particles are configured to migrate within the fluid in a direction responsive to an applied magnetic field gradient, comprises the steps of: (A) contacting a first location on a first surface of the device with a stylus comprising a magnetic tip to cause a third type of particles to migrate towards the first location, and (B) contacting again the first location on the first surface of the device with the stylus comprising a magnetic tip to cause a second type of particles to migrate towards the first location.

The aspects and embodiments described above, as well as additional aspects and embodiments, are described further below. Other aspects of the present invention will be apparent in view of the following description. These aspects and/or embodiments may be used individually, all together, or in any combination of two or more, as the application is not limited in this respect.

BRIEF DESCRIPTION OF THE FIGURES

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
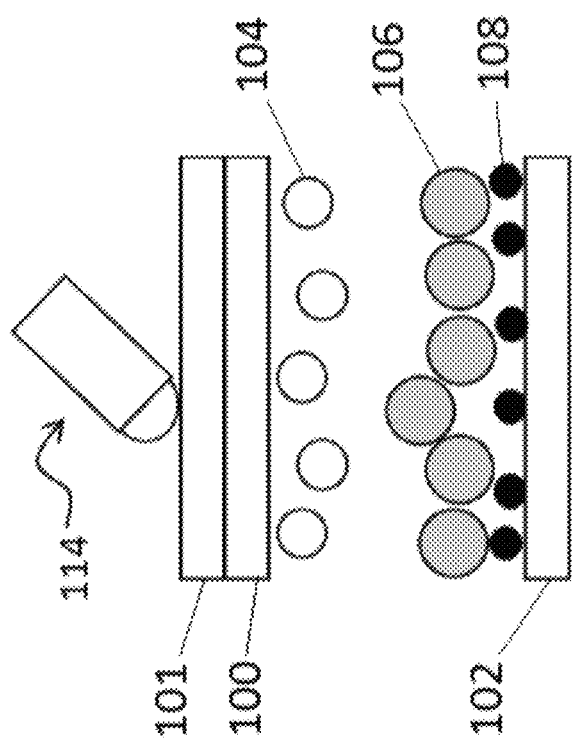
FIG. 1 illustrates a cross-sectional side view of an addressable electro-optic display in combination with a first stylus according to a first embodiment of the present invention.

Various embodiments of the present invention relate to electrophoretic media and particle-based electro-optic displays, which are electrically and magnetically addressable. The various embodiments of the present invention may be configured to provide both global and local addressing capabilities. The global addressing capability may be used to create a solid color state, for example white or black, and therefore be considered an "erase" state. The global addressing state may be electrically controllable. For example, the display may include electrodes on opposing sides of a particle-based electro-optic layer of the display, and the electrodes may be operated to create a suitable electric field to set the ink to a uniform color state. The display may include a controller for controlling the electric field presented to the electrophoretic particles. The controller may apply a static electric field or a time-dependent electric field, i.e., a waveform. The local addressing capability may be provided by one or more writing implements creating an electric or magnetic field. The term "writing implement" as used herein includes a stylus.

The terms used herein that refer to particles as "magnetic" and "magnetically responsive" and "responsive to a magnetic field gradient" and "magnetically addressable" and "configured to migrate within the fluid in a direction responsive to an applied magnetic field gradient" are synonymous. They refer to particles that migrate in the liquid dispersion medium upon the application of a magnetic field gradient and may form chains. Such particles may be referred in the scientific literature as magnetophoretic particles.

According to one embodiment of the present invention, an electrophoretic media may comprise a dispersion of a plurality of charged particles. The plurality of electrophoretic particles preferably include at least three different sets of particles: a light-scattering white pigment, a light-scattering, magnetic, colored pigment, and a black pigment. The colored pigment may be any color other than white or black. In a preferred embodiment, the colored pigment is red or yellow. In order to control the mobility of each set of charged particles through the dispersion fluid, one or more of the sets of particles may include a core pigment having a polymer coating, typically a polymer grafted or adsorbed to the surface of the pigment particles, such as those described in U.S. Patent Application Publications 2015/0103394 and 2016/0085121. The diameter of the core pigments and/or thickness of the coatings may differ between the sets of charged particles.

In a preferred embodiment of the present invention, the black pigment and the light-scattering, magnetic, colored pigment have the same charge polarity, while the white pigment has the opposite polarity, and only the light-scattering, magnetic, colored pigment is responsive to a magnetic field gradient, i.e. moves in a direction within the dispersion fluid in response to an applied magnetic field gradient.

The core pigment used in the white particle may be a metal oxide of high refractive index as is well known in the art of electrophoretic displays. Examples of materials for the white particle include, but are not limited to, inorganic pigments, such as $TiO_2$, $ZrO_2$, $ZnO$, $Al_2O_3$, $Sb_2O_3$, $BaSO_4$, $PbSO_4$ or the like.

The materials used as the core pigment for the black particle include, but are not limited to, CI pigment black 26 or 28 or the like (e.g., manganese ferrite black spinel or copper chromite black spinel) or carbon black.

The colored pigment particles are preferably non-black and non-white and may be of a color such as red, green, blue, magenta, cyan or yellow. The materials used as the core pigment for the light-scattering, magnetic, colored pigment include, but are not limited to, CI pigment PR 254, PR122, PR1.49, PG36, PG58, PG7, PB28, PB15:3, PY138, PY150, PY155 or PY20. Those are commonly used organic pigments described in color index handbook "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Examples of composite magnetic particles may include the materials described in U.S. Pat. No. 7,130,106.

In addition to the colors, the first, second and third types of charged particles may have other distinct optical characteristics, such as optical transmission, reflectance, luminescence or, in the case of displays intended for machine reading, pseudo-color in the sense of a change in reflectance of electromagnetic wavelengths outside the visible range.

The plurality of charged pigment particles may carry a natural charge or are charged through the presence of a charge controlling agent.

The percentages of the charged particles in the fluid may vary. For example, in a dispersion containing three types of particles, the black particle may take up about 0.1% to 10%, preferably 0.5% to 5% by volume of the electrophoretic fluid; the white particle may take up about 1% to 50%, preferably 5% to 15% by volume of the fluid; and the colored particle may take up about 2% to 20%, preferably 1% to 10% by volume of the fluid.

The electrophoretic media made according to the various embodiments of the present invention may further include one or more other optional components, such as uncharged neutral buoyancy particles, such as those described in US Patent Application 2015/0103394, charge control agents, and surfactants.

The dispersion fluid in which the plurality of particles are dispersed may be a clear and colorless solvent. The solvent preferably has a low viscosity and a dielectric constant in the range of about 2 to about 30, preferably about 2 to about 15 for high particle mobility. Examples of suitable dielectric solvent include hydrocarbons such as Isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluorobenzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Gulden from Ausirnont or Krytox Oils and Greases K-Fluid Series from DuPont, Del., polydimethylsiloxane based silicone oil from Dow-coming (DC-200).

As noted above, two types of charged pigment particles in a preferred embodiment of the present invention may carry opposite charge polarities. Furthermore, the third type of charged pigment particles may be slightly charged. The term "slightly charged" is intended to refer to the charge level of the particles less than about 50%, preferably about 5% to about 30%, of the charge intensity of the stronger charged particles. In one embodiment, the charge intensity may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse® 17000, available from Lubrizol Corporation, a Berkshire Hathaway company), with a weight ratio of 1:10 of the charge control agent to the particles. The mass of the diluted sample is determined and the sample is then loaded into the flow through cell for determination of the zeta potential.

The term "threshold voltage" or "electric field threshold", in the context of the present invention, is defined as the maximum electric field that may be applied for a period of time (typically not longer than 30 seconds, preferably not longer than 15 seconds), to a group of particles, without causing the particles to appear at the viewing side of a pixel, when the pixel is driven from a color state different from the color state of the group of particles. The term "viewing side", in the present application, refers to the first surface in a display layer where images are seen by the viewers.

The threshold voltage or electric field threshold is either an inherent characteristic of the charged particles or an additive-induced property.

In the former case, the threshold voltage or electric field threshold is generated, relying on certain attraction force between oppositely charged particles or between particles and certain substrate surfaces.

In the case of additive-induced threshold voltage or electric field threshold, a threshold agent, which induces or enhances the threshold characteristics of an electrophoretic fluid, may be added. The threshold agent may be any material, which is soluble or dispersible in the solvent or solvent mixture of the electrophoretic fluid and carries or induces a charge opposite to that of the charged particles. The threshold agent may be sensitive or insensitive to the change of applied voltage. The term "threshold agent" may broadly include dyes or pigments, electrolytes or polyelectrolytes, polymers, oligomers, surfactants, charge controlling agents and the like. Additional information relating to the threshold agent may be found in U.S. Pat. No. 8,115,729.

In one example, the electrophoretic medium may contain white pigment particles having a first charge of negative polarity, black pigment particles having a second charge of positive polarity and red pigment particles having a third charge of positive polarity. If the red pigment particles is slightly charged, as defined above, that is, the red pigment particles have weaker charge compared to the charges on the black and the white pigment particles, the black particles may require a "threshold voltage" to be applied across the electrophoretic medium in order to move to the viewing side of the electrophoretic medium, as opposed to the lower voltage required for the red particles to move to viewing side of the electrophoretic medium. The strong electrostatic attraction between the black particles and the white particles, which is smaller than the electrostatic attraction between the red particles and the white particles, causes the migration of the red particles adjacent to the light-transmissive electrically conductive layer when the applied voltage potential difference between the light-transmissive electrically conductive layer and a pixel electrode to generate an electric field weaker than the electric field threshold and having a polarity driving the red particles adjacent to the light-transmissive electrically conductive layer. Application of voltage potential difference between the light-transmissive electrically conductive layer and a pixel electrode to generate an electric field stronger than the electric field threshold (and having a polarity driving the black particles adjacent to the light-transmissive electrically conductive) is sufficient to overcome the electrostatic attraction between the white and black particles and causes the migration of the black particles adjacent to the light-transmissive electrically conductive layer.

The three types of charged particles may have varying sizes. In one embodiment, one of the three types of particles is larger than the other two types. For example, both the black and the white particles may be relatively small and their sizes (tested through dynamic light scattering) may range from about 50 nm to about 800 nm and more preferably from about 200 nm to about 700 nm, and the colored particles preferably are about 2 to about 50 times and more preferably about 2 to about 10 times larger than the black particles and the white particles. The values correspond to the average diameters of the corresponding pigment particles.

As explained above, the electrophoretic media according to the various embodiments of the present invention may be incorporated into a writable electro-optic display that utilizes one or more writing implements. The writing implements may be hand-held. At least one of the writing implements may produce an electric and/or a magnetic field that causes a change in an optical state of the display within an area local to the writing implement. The change in optical state may include movement of the white, colored, and/or black particles within the display.

Referring now to FIG. 1, a display according to one embodiment of the present invention may comprise a dispersion comprising a plurality of electrophoretic particles located between a first conductive layer 100 and a second conductive layer 102. As illustrated in FIG. 1, the display is viewed from above; therefore, the first conductive layer 100 may be a continuous layer of light-transmissive conductive material, such as indium tin oxide. The second conductive layer 102 may or may not be light transmissive. The layer 102 may be provided, for example, in the form of a substrate comprising an array of pixel electrodes, such as a TFT array. The display may further comprise touch-sensitive layer 101, such as a touch sensor, for sensing contact by a writing implement 114.

The electrophoretic particles may comprise, for example, negatively charged white pigment particles 104, positively charged black pigment particles 108, and positively charged, light-scattering, magnetic, colored pigment particles 106. As would be appreciated by one of skill in the art, the charge polarities of the particles may, in some example, be reversed, such that the white pigments is positively charged, while the black and magnetic particles are negatively charged. If the writable display is intended to include a highlighting function, the color of the magnetic particles 106 may be red, for example.

Figure 2:
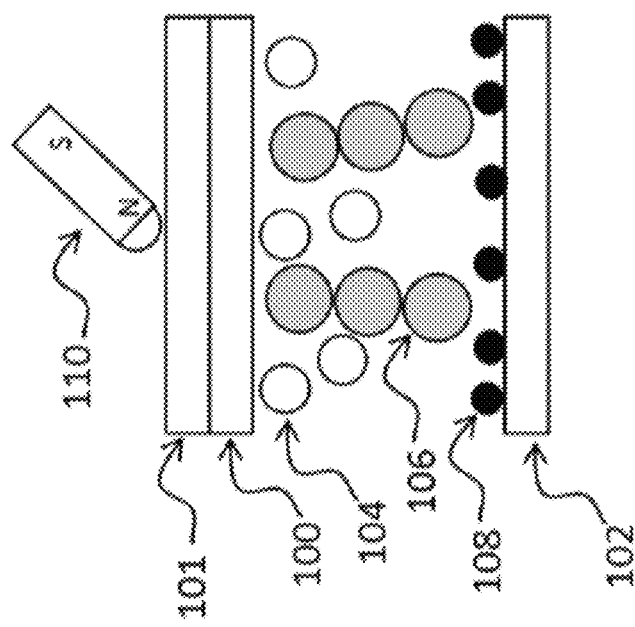
FIG. 2 illustrates a cross-sectional side view of the addressable electro-optic display of FIG. 1 in combination with a second stylus.
Figure 3:
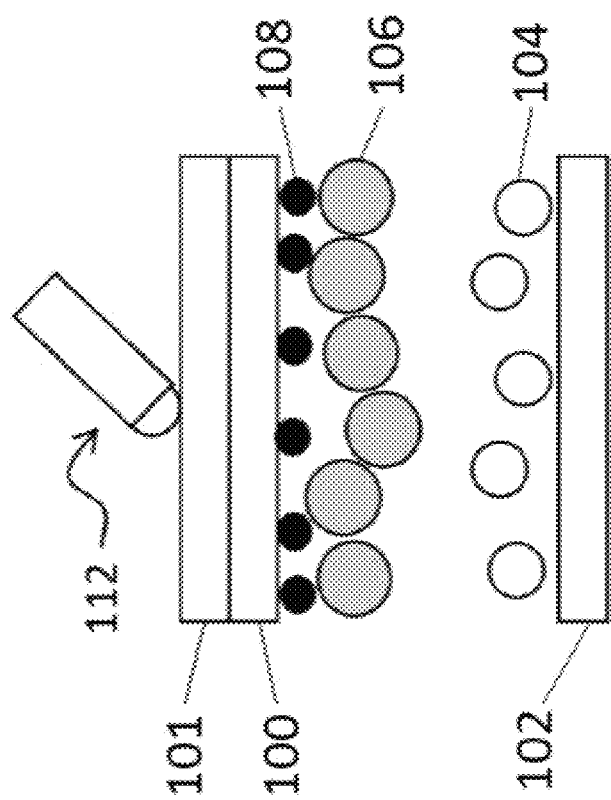
FIG. 3 illustrates a cross-sectional side view of the addressable electro-optic display of FIG. 1 in combination with a third stylus.

Referring now to FIGS. 1 to 3, the display according to one embodiment of the present invention may be combined with three different styli, 110, 112 and 114. Stylus 110 may be a magnetic stylus, used for writing the highlight color. Stylus 112 may be non-magnetic and used for writing black, while stylus 114 may be non-magnetic and used for writing white. Alternatively, all three of these functions may be incorporated into a single writing implement. For example, a single stylus may have one magnetic end for highlighting and an opposite end capable of switching between writing in either black or white. In FIGS. 1 to 3 the styli are illustrated with similarly shaped hemispherical tips; however, a writing tip of a writing implement as described herein is not limited to any particular shape. For example, each stylus may have a characteristic tip shape that may be detected by the touch-sensitive layer, so that the display recognizes which stylus is being used.

For all three stylus options, the touch-sensitive layer 101 may not only sense, but also record the location of writing, so that this information may be digitized and stored in memory, such that the written image may be saved, retrieved, and displayed at the user's discretion.

According to one method of operating a display according to the present invention, the optical states displayed at various locations on the display may be controlled with or without a writing implement. A first optical state illustrated in FIG. 1 may be achieved by contacting a surface of the display with stylus 114, such that the touch-sensitive layer 101 recognizes stylus 114 and its location. At this location, a voltage is applied between electrode layers 100 and 102, such that electrode layer 102 is negative relative to electrode layer 100. As a result, the white particles 104 are driven towards the viewing side of the display to display a white optical state about the area of contact by the stylus 114. For example, the negative voltage may be applied between electrode layer 100 and only the pixel electrodes within an area of electrode layer 102 corresponding to the position of stylus 114. In this manner, stylus 114 may be used as an "erasing stylus" to achieve local erasure of a black or a red image, for example. A global erase may be achieved, for example, without the stylus by simultaneously applying a negative voltage between every pixel electrode within electrode layer 102 and electrode layer 100.

A second optical state illustrated in FIG. 2 may be achieved by contacting a surface of the display with stylus 110. As previously explained, the type and location of stylus may be detected by the touch-sensitive layer 101. When stylus 110 is recognized, the electrophoretic fluid is not switched electrically (i.e., no voltage difference is applied between electrodes 100 and 102). Rather, the colored magnetic particles 106 move in the magnetic field gradient generated by the proximity of the stylus 110. Such, motion typically provides "chained-particle" states in which some of the particles located at the viewing surface (e.g. white pigment particles 104 in FIG. 2) have been displaced by the colored particles 106.

In some embodiments, the magnet incorporated in stylus 110 may be a permanent magnet. The magnet may be of any suitable type, including but not limited to neodymium iron boron, samarium cobalt, alnico, ceramic and ferrite magnets, or combinations thereof. While the magnet may be located in any portion of the stylus, the magnet is preferably oriented such that its magnetic field is co-aligned with the tip of the stylus. According to some embodiments, the magnet may be an electromagnet. In such cases, a suitable power source may be located within or electrically connected to the stylus and the magnet within the stylus. Furthermore, the magnet may have any suitable shape, including a cuboid or a ring shape. According to some embodiments, the magnet will produce a field gradient strength of between approximately 10 and 50 Gauss on the magnetic particles.

A third optical state illustrated in FIG. 3 may be achieved by contacting a surface of the display with stylus 112, such that the touch-sensitive layer 101 recognizes stylus 112 and its location. At this location, a voltage is applied between electrode layers 100 and 102, such that electrode layer 102 is positive relative to electrode layer 100. As a result, the black particles 104 are driven towards the viewing side of the display to display a black optical state about the area of contact by the stylus 112. For example, the positive voltage may be applied between electrode layer 100 and only the pixel electrodes within an area of electrode layer 102 corresponding to the position of stylus 112. In this manner, stylus 112 may be used as a "writing stylus," so that a user may use the display for note taking, for example.

In a preferred embodiment, the black pigment particles 108 may have a smaller diameter than that of the light-scattering, magnetic, colored particles 106, which have the same charge polarity. For example, referring again to FIG. 3, if both the black pigment particles 108 and colored magnetic particles 106 are positively charged, a positive voltage may be applied of sufficient strength and/or duration to enable the smaller black particles 108 to migrate to the viewing side of the display through the spaces between the magnetic particles 106 and obscure the colored particles 106.

Figure 4:
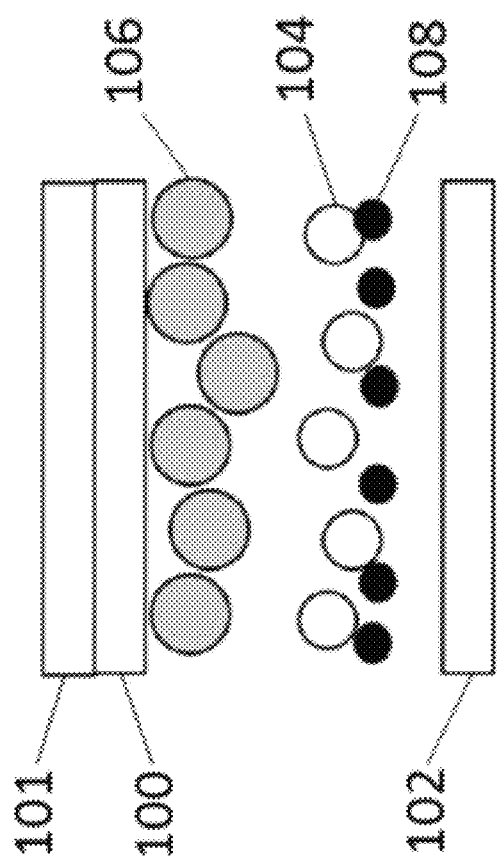
FIG. 4 illustrates a cross-sectional side view of the addressable electro-optic display of FIG. 1 displaying a first optical state.
Figure 5:
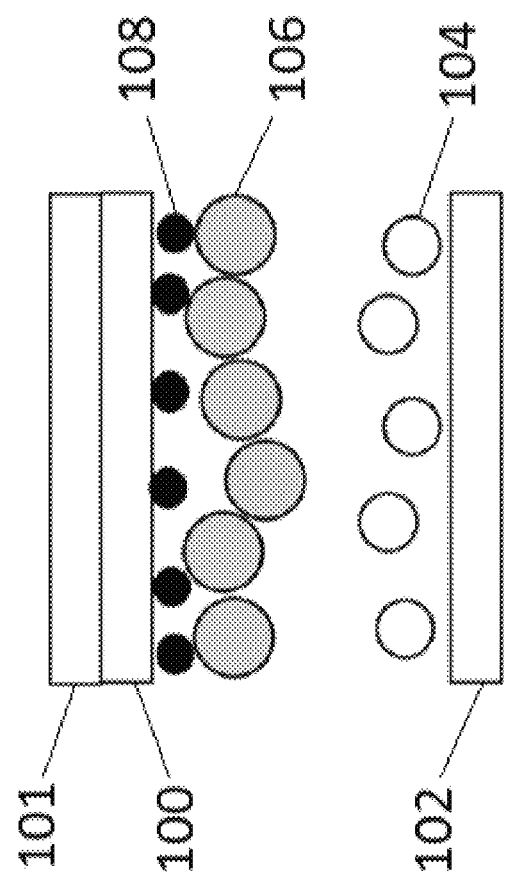
FIG. 5 illustrates a cross-sectional side view of the addressable electro-optic display of FIG. 1 displaying a second optical state.

In order to retrieve a stored image that includes pixels having an optical state provided by the colored magnetic particles, it may be preferred that the colored magnetic particles have a higher mobility than the similarly charged black particles. This may be accomplished by applying different polymer coatings to the colored and black particles and/or providing slightly charged black particles. For example, referring to FIG. 4, a voltage is applied between electrode layers 100 and 102, such that electrode layer 102 is positive relative to electrode layer 100. However, the strength and/or duration of the applied voltage is below a pre-selected threshold, such that colored magnetic particles 106 are driven to the viewing side of the display, but not the white particles 104 or black particles 108, which may be aggregated together. To provide pixels within a stored image having an optical state provided by the white or black particles, a negative voltage of sufficient strength and/or duration may be applied to drive the white particles 104 to the viewing surface or a positive voltage of sufficient strength and or duration may be applied to drive the black particles 108 between the colored particles 106 and to the viewing surface (as illustrated in FIG. 5).

Table 1 below summarizes an example of the various modes of writing/retrieving an image on a display according to an embodiment of the present invention. W represents white, K represents black, and R represents colored magnetic particles.

TABLE 1

| Initial State | Final State | Modality | Method |
| --- | --- | --- | --- |
| W | K | Writing | Touch stylus, TFT/high voltage (+) |
| W | R | Writing | Magnetic stylus, no electrical addressing |
| K or R | W | Local erase | Touch stylus, TFT/high voltage (−) |
| K or R | W | Global erase | TFT/high voltage (−) |
| W | K | Recall | TFT/high voltage (+) |
| W | R | Recall | TFT/low voltage (+) |

The electro-optic device, which comprises a first type of particles having a first color, a first charge of a first charge polarity (positively-charged white particles in the example corresponding to the table), a second type of particles having a second color, a second charge of a second charge polarity (negatively-charged black particles, which have an electric field threshold, in the example corresponding to the table), a third type of particles having a third color, a third charge of the second charge polarity (negatively-charged, red particles configured to migrate within the fluid in a direction responsive to an applied magnetic field gradient, in the example corresponding to the table), can be operated by a method comprising the steps of (A) contacting a first location on the first surface of the device with one of a first and second stylus, (B) applying an electric field to cause one of the first type (white) and second type (black) of particles to migrate towards the first location, (C) contacting a second location on the first surface of the display with one of the first and second stylus, and (D) applying a magnetic field gradient to cause the third type of particles (red) to migrate towards the second location.

Figure 6:
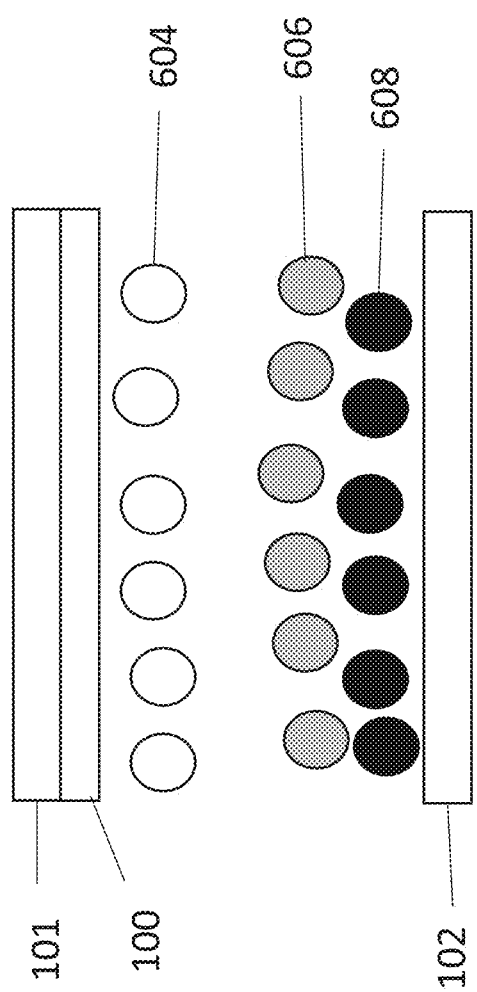
FIG. 6 illustrates a cross-sectional side view of the addressable electro-optic display in the white state.
Figure 7:
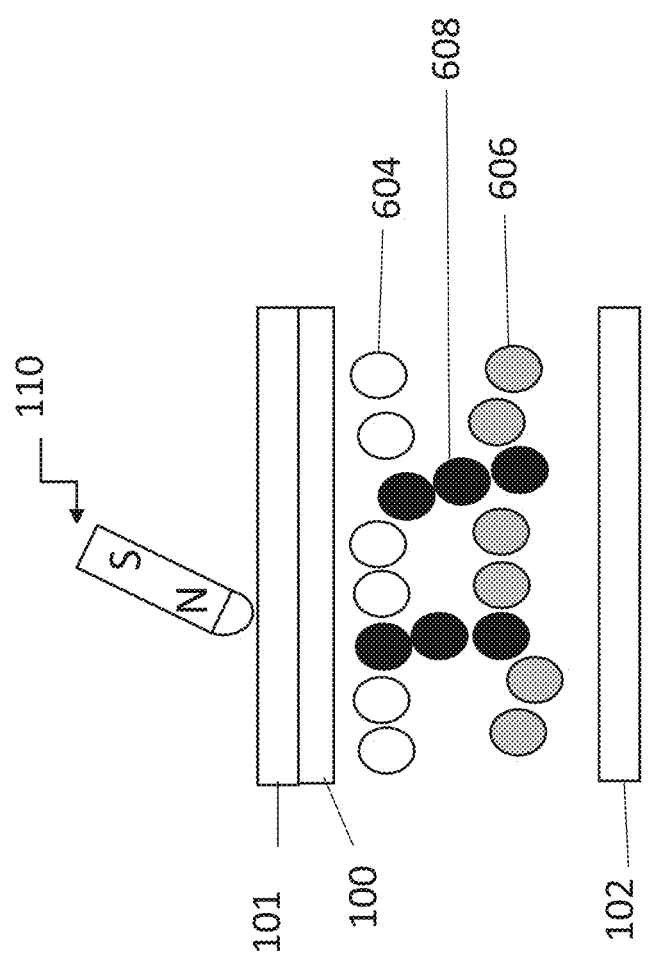
FIG. 7 illustrates a cross-sectional side view of the addressable electro-optic display of FIG. 6 in combination with a second stylus (contacting the stylus once).
Figure 8:
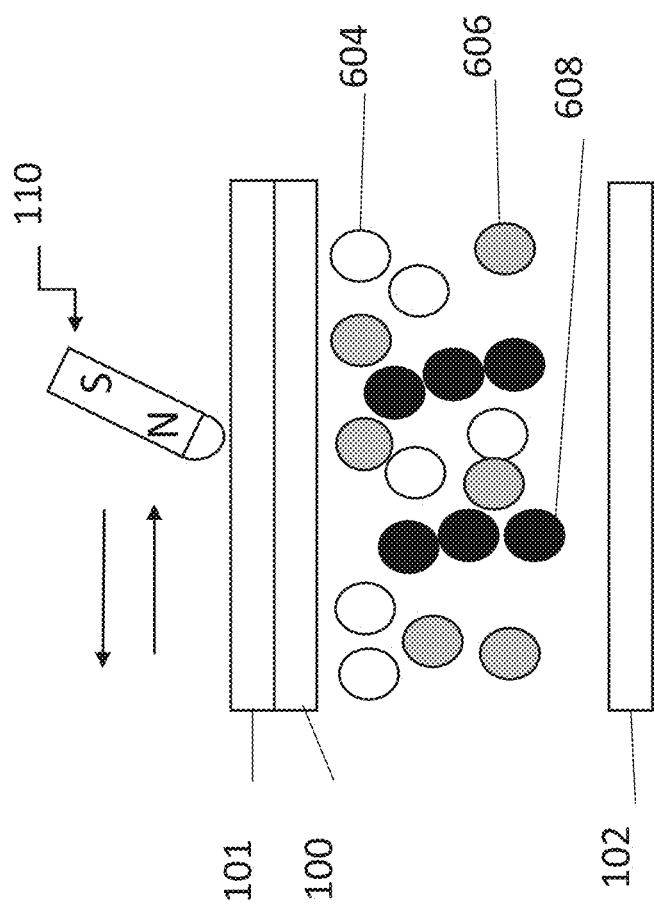
FIG. 8 illustrates a cross-sectional side view of the addressable electro-optic display of FIG. 6 in combination with a second stylus (contacting the stylus more than once).
Figure 9:
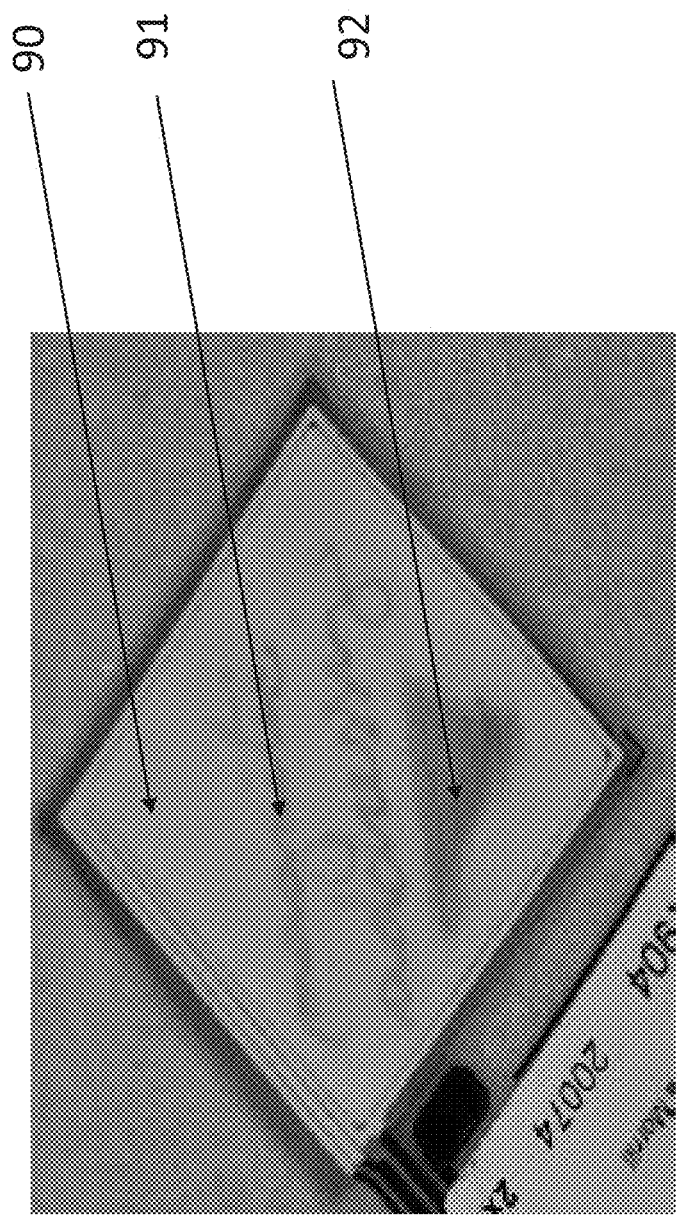
FIG. 9 shows a photograph of an addressable electro-optic display contacted by a magnetic stylus to write a phrase and to make a drawing.

In another embodiment, the electro-optic device comprises an electrophoretic medium comprising negatively-charged white particles 604, positively-charged red particles 606, and positively-charged black magnetic particles 608. It was observed that, starting from the white state (FIG. 6), and contacting the writable surface of the electro-optic display with a magnetic stylus 110 once, a grey image is created. The magnetic stylus attracted and aligned the magnetic black particles 608, as graphically illustrated in FIG. 7. After the magnetic stylus was applied more than one times at the same location of the writable surface of the electro-optic device where the grey color existed, the color of the location changed to red. This is graphically illustrated in FIG. 8 and in the photograph of FIG. 9. The electro-optic device 900 of FIG. 9, which was original in its white state 901, was contacted by a magnetic stylus and the phrase "magnetic addressing" 902 was written on it. The phrase appears grey. In another location of the electro-optic device 900, a magnetic stylus was used to make a drawing 903. The stylus contacted the electro-optic device multiple times on the location of the drawing 903. The drawing 903 appears to be in red color. The electrophoretic medium of the embodiment was prepared using Isopar E as the electrophoretic fluid, which comprises (a) Solsperse 19000 (supplied by Lubrizol) as a charge control agent, (b) positively-charged iron oxide black magnetic pigment (Pigment Black 11), (c) negatively-charged titanium dioxide white pigment (Pigment White 6), and (d) negatively-charged red (Pigment Red 254). In the case where the starting optical state is black, contacting the writable surface of the electro-optic display with a magnetic stylus once, a red image was created, which becomes a brighter red after application of magnetic stylus more than one times at the same location of the writable surface of the electro-optic device. FIG. 9 shows the demonstrates the display This embodiment describes an electro-optic device that comprises (a) an electrophoretic medium disposed between a light-transmissive electrically conductive layer and an array of pixel electrodes and comprising a plurality of particles in a fluid, the plurality of particles comprising (1) a first type of particles having a first color, a first charge of a first charge polarity, (2) a second type of particles having a second color, a second charge of a second charge polarity, and (3) a third type of particles having a third color, a third charge of the second charge polarity, wherein the first, second and third colors are different from one another, wherein the first charge polarity is opposite to the second charge polarity, wherein the plurality of particles are configured to migrate within the fluid in a direction responsive to an applied electric field, and wherein the third type of particles are configured to migrate within the fluid in a direction responsive to an applied magnetic field gradient. This electro-optic device can be operated by a method comprising the steps of (A) contacting a first location on a first surface of the device with a stylus comprising a magnetic tip to cause a third type of particles to migrate towards the first location, and (B) contacting again the first location on the first surface of the device with the stylus comprising a magnetic tip to cause a second type of particles to migrate towards the first location. The method enables the user to write or draw in a device using two different colors.

The dispersions of electrophoretic media according to the various embodiments of the present invention may be encapsulated. Encapsulated electrophoretic media comprise numerous small capsules, each of which itself comprises an internal phase containing electrophoretically mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. Microcells may be formed either in a batchwise process or in a continuous roll-to-roll process as disclosed in U.S. Pat. No. 6,933,098. The latter offers a continuous, low cost, high throughput manufacturing technology for production of compartments. The microcells may be fabricated with embossing, photolithography, contact printing, vacuum forming, or other suitable methods. In this construction, the microcells may be sandwiched between a light-transmissive electrically conductive layer and an array of pixel electrodes. In one embodiment, the microcells are fabricated separately and then positioned between the light-transmissive electrically conductive layer and an array of pixel electrodes. For example, the microcell structure may be fabricated by embossing. The embossing is usually accomplished by a male mold, which may be in the form of a roller, plate or belt. The embossed composition may comprise a thermoplastic, thermoset or a precursor thereof. The embossing process is typically carried out at a temperature higher than the glass transition temperature of the microcell material. A heated male mold or a heated housing substrate against which the mold presses may be used to control the embossing temperature and pressure. The male mold is usually formed of a metal such as nickel. Once formed, the microcells are filled with the electrophoretic medium, The filled microcells are then sealed and the sealed microcell are laminated between a light-transmissive electrically conductive layer and an array of pixel electrodes.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing the array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. A lamination technique for mass production of displays by this process is roll lamination using a lamination adhesive. Similar manufacturing techniques can be used with other types of electro-optic displays. For example, a microcell electrophoretic medium may be laminated to a backplane in substantially the same manner as an encapsulated electrophoretic medium.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a. thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered. Trade Mark) from du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, especially in the case of a display using an encapsulated electrophoretic medium. The lamination adhesive should have sufficient adhesive strength to bind the electro-optic layer to the layer (typically an electrode layer) to which it is to be laminated, and in the case of an encapsulated electrophoretic medium, the adhesive should have sufficient adhesive strength to mechanically hold the capsules together. If the electro-optic display is to be of a flexible type, the adhesive should have sufficient flexibility not to introduce defects into the display when the display is flexed. The lamination adhesive should have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 130° C. since the medium cannot be exposed to substantially higher temperatures without damage, but the flow of the adhesive must cope with the relatively uneven surface of the capsule-containing layer, the surface of which is rendered irregular by the underlying capsules. The lamination temperature should indeed be kept as low as possible, and room temperature lamination would be ideal, but no commercial adhesive has been found which permits such room temperature lamination. The lamination adhesive should be chemically compatible with all the other materials in the display.

Having thus described several aspects and embodiments of the technology of this application, it is to be appreciated that various alterations, modifications and improvements will readily occur to those of ordinary skill in the art. Such alterations, modifications and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

What is claimed is:

1. A method of operating an electro-optic device, wherein the electro-optic device comprises (a) a first surface on a viewing side; (b) a second surface on the opposite side of the first surface; (c) an electrophoretic medium disposed between a light-transmissive electrically conductive layer and an array of pixel electrodes and comprising a plurality of particles in a fluid, the plurality of particles comprising (1) a first type of particles having a first color, a first charge of a first charge polarity; (2) a second type of particles having a second color, a second charge of a second charge polarity; and (3) a third type of particles having a third color, a third charge of the second charge polarity; wherein the first, second and third colors are different from one another; wherein the first charge polarity is opposite to the second charge polarity; wherein the plurality of particles are configured to migrate within the fluid in a direction responsive to an applied electric field; and wherein the third type of particles are configured to migrate within the fluid in a direction responsive to an applied magnetic field gradient;

comprising the steps of:

contacting a first location on a first surface of the device with a stylus comprising a magnetic tip to cause a third type of particles to migrate towards the first location;

contacting again the first location on the first surface of the device with the stylus comprising a magnetic tip to cause a second type of particles to migrate towards the first location.

* * * * *